UNITED STATES PATENT OFFICE.

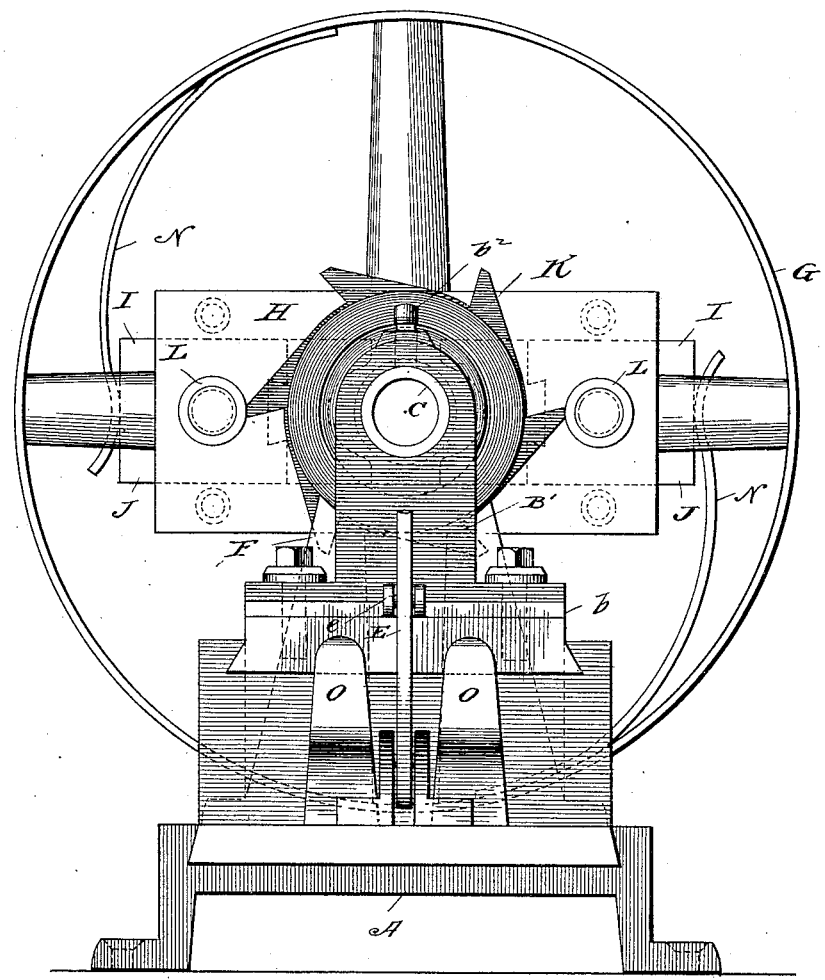

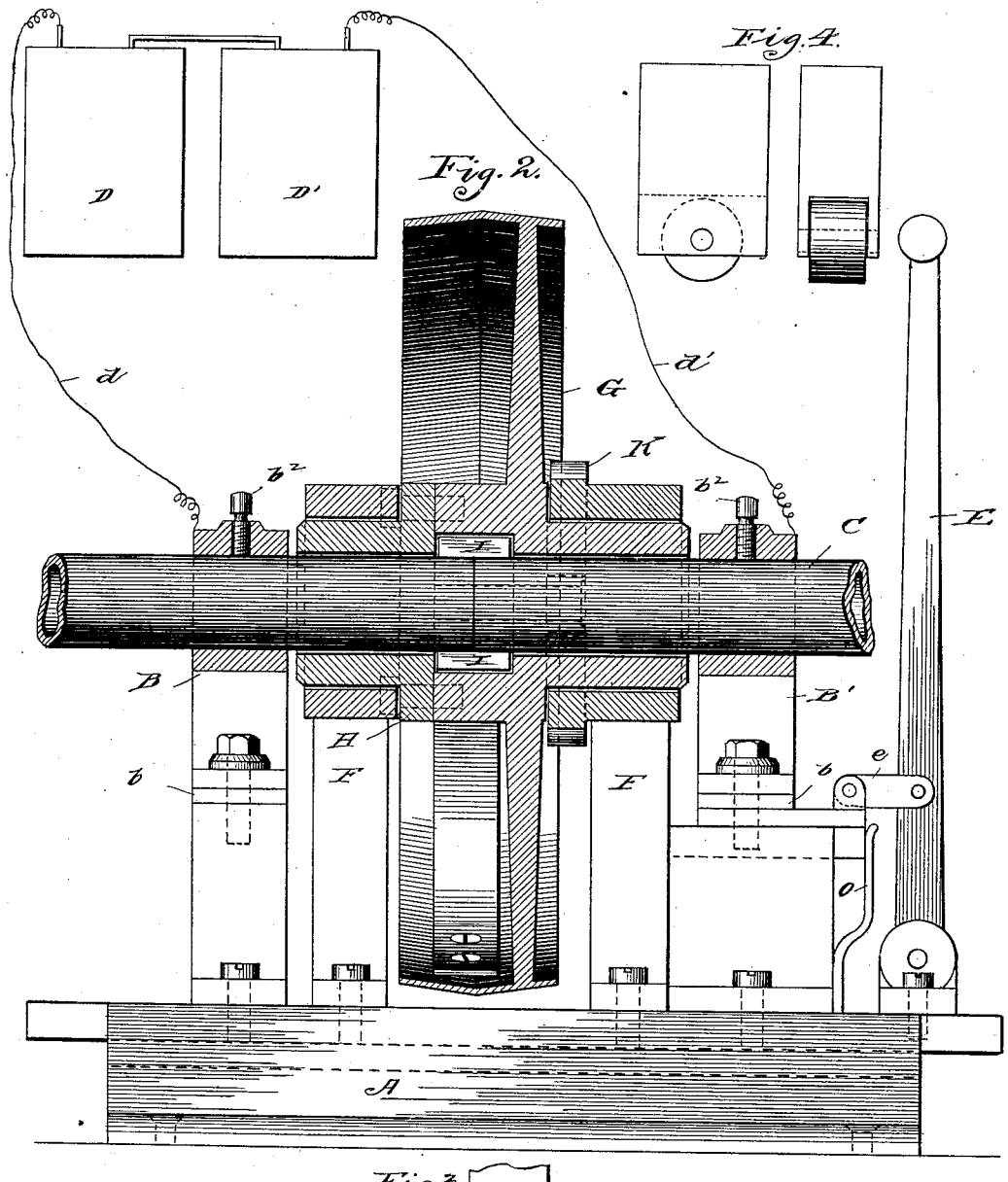

HERBERT E. FOWLER, OF NEW HAVEN, CONNECTICUT, ASSIGNOR OF ONE-HALF TO D. T. HEDGES, OF SIOUX CITY, IOWA.

ELECTRICAL PIPE OR METAL WELDING MACHINE.

SPECIFICATION forming part of Letters Patent No. 417,013, dated December 10, 1889.

Application filed July 5, 1889. Serial No. 316,532. (No model.)

*To all whom it may concern:*

Be it known that I, HERBERT E. FOWLER, a citizen of the United States, residing at New Haven, Connecticut, have invented certain new and useful Improvements in Electrical Pipe or Metal Welding Machines, of which the following is a specification.

My invention relates to a machine for welding pipe and metallic rods or bars by means of electricity; and the object of my invention is to provide a machine which shall form the weld by working the joint without removing any of the metal, and thereby I approximate more nearly by the use of this machine the method of hand or power hammer welding.

In carrying out my invention I employ, by preference, means for holding the parts stationary and for supplying an electrical current to the respective sections which are to be united; means for forcing or crowding the sections endwise, whereby, when the metal is fused, the abutting ends are upset, and means for rotating welding appliances, which may be either hammers or rolls, about the work, and delivering the blows or pressure upon the upset part of the pipe, whereby it is hammered or rolled down at that point and a secure weld formed without removing any of the metal from the joint.

In the accompanying drawings, Figure 1 is an end elevation of the machine of the preferred construction, some of the parts broken away and others omitted. Fig. 2 is a side elevation, partly in section. Fig. 3 shows a section of pipe with its end upset and a mandrel inserted in the pipe, and showing the hammer ready to act to form the weld; and Fig. 4 shows a form of roll which may be employed instead of the hammer described, the views being respectively a side and an edge elevation of the same part.

The machine is mounted on a suitable base A, having the standards B B', with bearings therein for the pipe C. These standards are insulated at $b$ from the base of the machine, and are connected, respectively, to the batteries D D' by the wires $d\ d'$. Standard B' is movably mounted in ways, and is adapted to be moved by means of the pivoted lever E, having the link $e$ connected to a stud on the said standard. The sections of pipe may be secured against rotation in the standards B B' by means of the set-screws $b^2$.

F F represent uprights or standards also secured to the frame A, and which have in their upper ends journal boxes or bearings for the hub of the pulley-wheel G, which will be rotated in its bearings by means of a suitable belt.

H represents a guide-flange secured with the hub of pulley G and having ways formed therein, within which ways hammers I move. These hammers are preferably mounted upon head-blocks J, and they have curved faces, as shown by the dotted lines in Fig. 1. Instead of the hammers, the rolls shown in Fig. 4 may be secured in the ways and adapted to form the weld by being rotated in contact with the upset portion of the pipe. I prefer, however, to form the weld by means of the hammers shown in Fig. 1, which are reciprocated by the cam-wheel K, which is secured to or formed integrally with the fixed bearings of the pulley-hub, and which cam-wheel is adapted to engage studs L, projecting from the sides of the hammer-heads. Such heads are backed by suitable springs—such as those marked N in the drawings—which have a constant bearing at their free ends upon said heads and have their opposite ends secured to the rim of the pulley. A spiral bow or other form of spring may be substituted, or other means may be employed for reciprocating the hammer to deliver the blow.

I prefer to use leaf-springs O, which are secured at one end to a fixed part of the frame, and which have a bearing at their free ends upon the sliding standard B', so that after the ends of the pipe have been upset and the welding commenced the standard B' may move back with the pipe as the latter is slightly extended by the welding operation.

The operation of the machine is as follows: Two sections of pipe, rod, or bar are secured in the bearings of the standards B B', with their ends in contact, and the current of electricity is passed along the wires to the pipe. When the abutting ends of the sections are sufficiently heated or fused, the movable standard B', with its section of pipe, is forced against the other, thus upsetting the ends of the pipe, as shown in Fig. 3. The pulley carrying the hammers or rolls is then rotated around the work and the blows or pressure delivered upon this upset portion by the hammer or rolls, as the case may be, thus spreading the metal on both sides of the joint and forming a secure weld without removing any of the metal raised by the upsetting. Where the machine is used to weld pipe, a mandrel P may be inserted to prevent unevenness on the interior.

I do not limit my invention to the precise mechanism herein shown, as my invention consists, broadly, in the combination of suitable mechanisms for holding two sections of metal pipe, bar, or rod with their ends in contact, fusing said ends by means of an electrical current, upsetting said ends, and suitable rolls or hammers for reducing or welding this upset portion without removing any of the metal from the pipe.

I claim—

1. In a machine for welding metal by electricity, the combination, with means for holding the parts to be welded against rotation, of electrical apparatus for directing a current of electricity to the point of weld, means for moving the parts whereby to upset the ends, welding appliances—such as hammers or rolls—adapted to be rotated about the parts to be welded, and means for actuating the welding appliances whereby to form the weld, substantially as described.

2. In a machine for welding metal by electricity, the combination, with means for holding the parts to be welded, of suitable electrical appliances for delivering a current of electricity to the point of weld, one of the supports for the parts to be welded being movable in the line of said part, whereby the parts may be forced together and their ends upset, reciprocating welding appliances—such as hammers or rolls—rotatably mounted, and means for rotating the welding appliances about the work and for reciprocating them to perform the welding, substantially as described.

3. In a machine for welding metal by electricity, the combination, with supports for holding the parts to be welded against rotation, said supports being insulated from the machine-frame and welding appliances, and one of them being adapted to move with its supported part, whereby to upset the ends of said parts, a pulley journaled on supports and having a hollow hub, welding appliances—such as hammers or rolls—secured to rotate with the pulley and adapted to be moved to perform the weld, springs having a bearing upon the welding appliances and upon the pulley, and a stationary cam device adapted to operate the welding appliances, of electrical appliances for delivering a current of electricity to the point of weld, substantially as described.

HERBERT E. FOWLER.

Witnesses:
C. C. LINTHICUM,
FREDERICK C. GOODWIN.